Jan. 12, 1971 — W. G. BAIRD, JR — 3,553,928

SHRINK PACKAGING WITH COMPRESSION CHAMBER

Filed Sept. 26, 1969

INVENTOR

WILLIAM G. BAIRD, JR.

BY *William D. Lee Jr.*
ATTORNEY

Jan. 12, 1971   W. G. BAIRD, JR   3,553,928
SHRINK PACKAGING WITH COMPRESSION CHAMBER
Filed Sept. 26, 1969                              2 Sheets-Sheet 2

INVENTOR

WILLIAM G. BAIRD, JR.

BY:
*William L. Lee Jr.*
ATTORNEY

United States Patent Office 3,553,928
Patented Jan. 12, 1971

3,553,928
SHRINK PACKAGING WITH COMPRESSION CHAMBER
William G. Baird, Jr., Spartanburg, S.C., assignor to W. R. Grace & Co., Duncan, S.C., a corporation of Connecticut
Filed Sept. 26, 1969, Ser. No. 861,353
Int. Cl. B65b *53/06*
U.S. Cl. 53—30       8 Claims

ABSTRACT OF THE DISCLOSURE

A process and apparatus for heat shrinking polymeric members. When compressible fluids are compressed, heat is generated, and oriented polymeric members in the presence of such heat undergo shrinkage. In one embodiment the polymeric member is oriented film, and the compressible fluid is air.

BACKGROUND OF THE INVENTION

In general, this invention relates to the heat shrinking of oriented polymeric members. More particularly the invention relates to the heat shrinking of oriented polymeric films in the presence of compressibly heated fluids.

It is well known to employ various flexible, heat shrinkable films in the packaging of products. These heat shrinkable films provide inexpensive packages which will prevent contamination of enclosed products and preserve their original state for relatively long periods of time. In addition, these films enhance the appearance of products and conform to the contours of objects due to their transparency and shrinking characteristics respectively.

A number of devices have been proposed for heat shrinking of film overwrapped about objects. These devices include: "heat shrink tunnels" employing hot air or hot water as a heating medium, and "hot air guns" which forcibly impinge hot air onto film enclosed objects. Although all of these devices generally perform their functions satisfactorily, each requires a somewhat distinct and separate means for providing heated fluids, either air or water, for shrinking films.

For example, heating elements and blowing means are generally necessary to the operation of hot air tunnels as well as hot-air guns. Hot water tunnels likewise require heating sources to raise the liquid temperature sufficiently high for shrinking of films.

Therefore, it is an object of this invention to eliminate such separate and distinct heating means heretofore employed in shrinking polymeric members.

Another and a primary object of this invention is to provide process steps and apparatus elements for heat shrinking a polymeric member.

It is another object of this invention to provide steps and elements for shrinking a polymeric member in the presence of compressibly heated fluids.

It is a further object of this invention to provide steps and elements for compressing and thereby heating fluids in whose presence a heat shrinkable member is located.

It is an additional object of this invention to provide process steps and apparatus elements for heat shrinking a polymeric member wherein said member is polymeric film.

It is still another object of this invention to provide steps and elements for simultaneously heat shrinking and transporting a plurality of polymeric films at least partially enclosed about objects.

SUMMARY OF THE INVENTION

The foregoing objects are achieved in general by enclosing a product in oriented film and placing it into a confined zone. The fluid pressure in said zone is then increased, while maintaining seals between the interior and exterior of the zone so that heat is generated, and so that said film shrinks about the object to form a tightly encased product.

In the preferred embodiment, film shrinkage occurs within a cylindrical chamber whose volume is reduced by the action of a simple piston compressing means, said piston being slidable within the cylinder. First, the film enclosed object is transported into the chamber. This is done by either completely withdrawing the piston from said chamber and inserting the object through the opening created, or by maintaining the piston within the chamber and opening a portion of the chamber for insertion of the product, (the product may be placed within the chamber by mechanical means or by human operator). Subsequent to transporting the product into the chamber the piston compressing means is actuated in such a manner as to reduce the volumetric capacity of said chamber. As the volumetric capacity is reduced, the fluid, (which may be air), contained within the chamber becomes compressed.

When the volume has been reduced, and the pressure and temperature subsequently increased, the film in the presence of the heated air will shrink about the object to form a tightly encased product. In order to contain the heated air within the chamber, seals between the piston and cylinder walls are necessary. Any of the well known types of sealing means employed in cylinders where compression is undergone may be used.

The temperature and pressure to be generated will depend on the requirements of the particular polymeric member to be heat shrunk. By way of example, biaxially oriented low density polyethylene films are generally heated to between 180° F. and 220° F. for heat shrinkage. Therefore, the minimum chamber air temperature could not be less than about 180° F. for these films. However, due to the fact that film temperature depends on heat transfer thereto, the upper chamber air temperature limit need not be 220° F. It has been found in one embodiment that a chamber temperature of 1,000° F. may be employed to heat shrink polyethylene films. In this embodiment the chamber heat loss was high, and thus the elevated air temperature was required to obtain sufficient heat transfer to the film for shrinkage thereof. In most cases where the volume of chambers is reduced to effect increased pressure and particularly temperature, the relationships therebetween will follow laws as set forth by Boyle, Charles, Guy-Lussac et al. The general gas law has been incorporated into the following formula:

$$\frac{P_1 V_1}{T_1} = \frac{P_2 V_2}{T_2}$$

Various combinations and modifications of the gas law exist to account for systems which are adiabatic, polytropic, isentropic, etc. in thermal character. In a compressing system that is adiabatic, (no heat loss occurring therefrom) the gas law formula is modified somewhat as follows by adding the exponent K to account for the particular medium to be compressed (1.4 for air):

$$\frac{T_2}{T_1} = \left(\frac{V_1}{V_2}\right)^{(K-1)} = \frac{P_2^{(K-1)}}{P_1} \bigg/ K$$

However, in most compressing means there is a degree of heat loss, which necessitates the use of the formulae for polytropic relationships. The basic polytropic formula is generally stated by the following:

$$\frac{T_2}{T_1} = \left(\frac{V_1}{V_2}\right)^{(N-1)} = \frac{P_2^{(N-1)}}{P_1} \bigg/ N$$

The exponent N is dependent on the heat loss from the systems and is determined by empirically noting $P_1$, $P_2$, and $V_2$ values for a given polytropic system and by employing these values in solution of the following formula:

$$N = \frac{(\text{Log } P_1 \text{ Log } P_2)}{(\text{Log } V_2 \text{ Log } V_1)}$$

For the purpose of the following invention, the type of system (either near adiabatic or polytropic), is not critical. The only critical aspect is that the temperature of a confined gas be raised by increased pressure, or by reduced zone volume or preferably by both so that oriented films in heat exchange contact therewith will be heat shrunk. However, since an ideal adiabatic compressing system where no heat loss occurs is almost impossible to achieve, it is not preferred, but rather expected that embodiments falling within the broad scope of present invention will be in some degree polytropic. The particular embodiments discussed hereinafter are polytropic in nature.

Still referring to the above embodiment, and subsequent to obtaining desired film shrinkage, the product may be removed from the chamber by any of several means. Air pressure may be reduced by means of venting valve, and a portion of the cylinder then opened for package removal. Likewise, air pressure may be vented through a valve, and the piston itself completely withdrawn for removal of the package, or the piston may be withdrawn from the cylinder and the package removed without prior venting of air compressed within the cylinder. It is also possible to vent said compressed air into a vessel or the like so that in subsequent shrinkage cycles, at least a portion of said compressed air may be re-used.

Although a cylinder much larger than the film enclosed object may be employed in heat shrinkage thereof, it is generally preferred for economic reasons to use a cylinder not substantially larger than required for proper film shrinkage. For instance, a 1-inch square by a ⅛ inch thick product loosely overwrapped with irradiated polyethylene film may be shrunk in a piston closure chamber whose initial dimensions of 2 inches diameter by 8 inches are reduced to 2 inches diameter by 1 inch. With a final or $P_2$ pressure of 414.7 p.s.i. generated, and with a polytropic heat loss factor N of 1.34, the compressed gases will be raised to a temperature of 790° F. Either one stroke of the piston compressing means may be employed for film shrinkage, or multiple cyclic strokes may be applied for additional shrinkage.

The invention is not to be limited to any particular type of heat-shrinkable film. Any of the well-known heat-shrinkable thermoplastic films may be employed, such as the oriented polyolefins (including, but not limited to polyethylene, polybutene-1), the polyvinyls, the polyesters, vinylidene chloride polymers (such as saran), polyamides (such as nylon), polystyrene and the like. The particular temperatures will vary within. The term "polymer" as employed herein includes homopolymers, copolymers, terpolymers, block copolymers, random copolymers, graft copolymers, and the like. The films may also be laminates of different films. The films must be heat shrinkable and are thus molecularly oriented, either mono- or preferably biaxially oriented. The films, e.g., polyethylene, may be irradiated such as described in patents to Baird, U.S. 3,022,543 and Rainer et al., U.S. 2,877,500. Preferably the film is 0.1 to 20 mils thick.

Nor is the invention to be limited to any type, size or shape of product. However, due to the gas pressure which will necessarily be generated for proper film shrinkage, substantially flat, substantially non-hollow objects may be best enclosed in the manner of the invention. Phonograph records are one example of this type of product.

Depending on the particular product requirements, the film package may be sealed or unsealed prior to heat shrinking. The manner of film sealing is well known in the art. If the film is sealed prior to heat shrinkage a gas escape means is preferably provided between the interior space defined by the film and the space exterior thereof defined by the chamber. The gas escape means may be simply a small hole in the film communicatory to the spaces interior and exterior thereof.

Any type of chamber or zone may be used for heat shrinking of film. Cylindrical chambers of other than circular cross-section may be employed. The art of compressing gases in chambers is well known and any applicable chamber may be used. Although it is preferred to employ chambers whose volume is reduced to achieve increased pressure and temperature, chambers of fixed dimensions wherein compressed gases are introduced to increase the pressure of chamber gases may likewise be used. According to the gas laws, increased temperature results from increased pressure when the volume of confined zone remains constant.

Nor is the invention to be limited to single chambers. Bodies housing a plurality of chambers may be employed for simultaneously transporting, heat shrinking, and removing from chambers a plurality of films at least partially enclosing objects.

A body or assembly housing a plurality of chambers may be used so that relative linear motion is possible between the body and a piston compressing means. In this embodiment, as the piston means compresses gas in one chamber (into which a film enclosed product has been placed), products having been previously film overwrapped and heat shrunk may be simultaneously transported into other chambers (such transferral and removal being accomplished either by human operator or machine). The relative linear motion between the body housing said plurality of chambers and said piston compressing means occurs in serial fashion so that one chamber may be loaded (have the product placed inside), then brought along a line to a communication with the piston means; then brought in a line away from the piston; then unloaded. While loading or unloading takes place, other chambers are in communication (or being acted on), by said piston compressing means.

In a similar manner a cylindrical body or assemble housing a plurality of chambers may be used so that the relative arcuate motion is possible between the body and a piston compressing means. Nor are the compressing means described in any of the foregoing to be limited to a particular type of device or piston. For example, it is possible to heat shrink film overwrapped about objects in chambers whose contained gases are heated by the well known, rotary piston gas compressing means.

Nor is the invention limited to the shrinking of oriented film. Oriented polymeric filaments or the like may be heat shrunk into tight engagement about objects in the manner of the invention.

The following brief description of the drawings and discussion of the preferred embodiments further describes the present invention.

BRIEF DESCRIPTION OF THE DRAWINGS

Other objects and embodiments of the invention will become apparent from the following discussion of the drawings.

DESCRIPTION OF THE PREFERRED EMBODIMENTS

Figure 1:
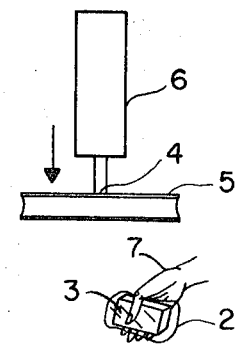
FIG. 1 is a simplified view showing how a piston may be withdrawn from a cylinder and a package transported through the opening created.

As illustrated in FIG. 1 the product 3 overwrapped in irradiated polyethylene film 2 is transported into a chamber 8 of circular cross-section and parallel elements the volumetric capacity of which is determined by the interior walls of a cylinder 1 and at times by the piston 4. As indicated, the product 3 is transported into a chamber 8 by the hand 7 of a human operator; however, the product may also be transported in the chamber by mechanical means (not shown).

Figure 2:
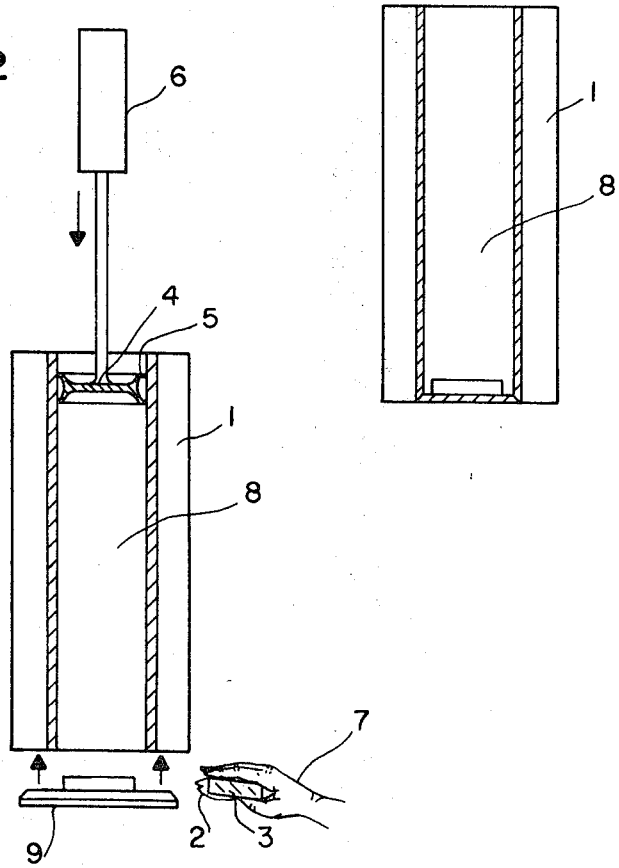
FIG. 2 is a simplified view showing how a piston may be allowed to remain within a cylinder and the opposite cylinder end opened for transporting a package into the chamber.

In an alternative method, in FIG. 2, the hand 7 of a human operator is shown as said hand is poised prior to transporting a product 3 through the opening created by detaching an end portion 9 of said cylinder 1. Again, a mechanical device (not shown) could be substituted for the human operator. Subsequent to placing the product into the chamber the end portion 9 is rejoined to said cylinder preferably in an air-tight manner. In this embodiment the piston 4 is not withdrawn from the chamber.

Figure 3:
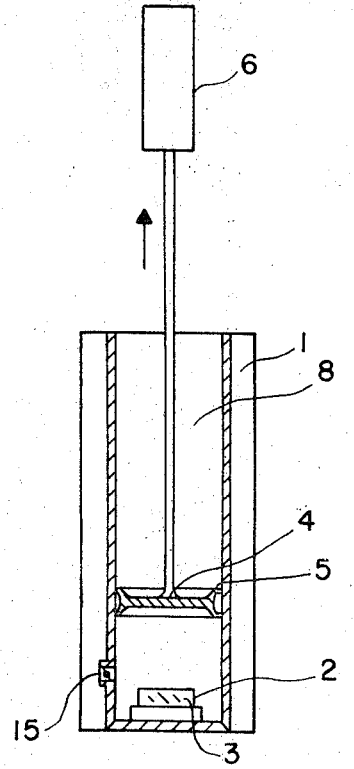
FIG. 3 is a simplified view showing how a piston may be used to compress gases within a chamber.

In FIG. 3 the piston 4 is actuated by actuating means 6 so that chamber 8 is confined and the volumetric capacity of chamber 8 is subsequently reduced. Gas contained within chamber 8 is not allowed to escape past piston seal 5, said gas being, therefore, compressed and heated, causing film 2 to heat shrink about overwrapped product 3. In this example, the volume was reduced from 25.3 in.$^2$ to 3.14 in.$^2$. Gas pressure of 414.7 p.s.i. was generated in the chamber and a gas temperature of 790° F. was produced. The heat loss factor N was computed to be 1.34. In this system, shrinkage was found to occur over a range of approximately 450° F. to 850° F. with pressure corresponding thereto of approximately 225 p.s.i. to 525 p.s.i. However, in other systems falling well within the scope of the present invention, different films or different heat loss values N may yield different operating ranges.

Subsequent removal of the film overwrapped product from the chamber may be the reverse of the steps as noted in either FIG. 1 or FIG. 2. In addition, the gas vent valve 15 as seen in FIG. 3 may be employed to reduce gas pressure contained within chamber 8 prior to removal of said product, or the piston 4 may be completely withdrawn from chamber 8 without prior gas venting therefrom, or the detachable cylinder piece 9 may be removed from the cylinder body 1 without prior venting of gases from chamber 8.

Figure 4:
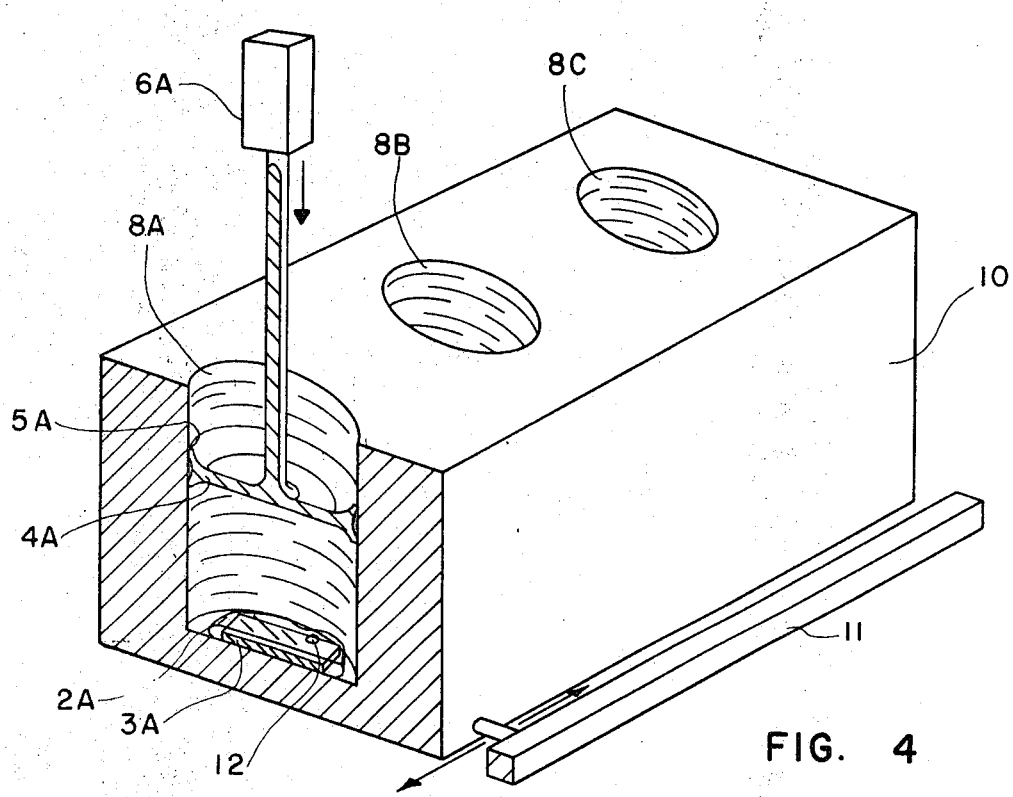
FIG. 4 is a simplified view of a body housing a plurality of chambers showing how relative linear motion is possible between said body and a piston compressing means.

In FIG. 4 a body 10 housing chambers 8A, 8B, 8C is depicted. FIG. 4 is intended to reveal steps and means by which at least one product 3A overwrapped in film 2A may be heat shrunk in the aforesaid manner in one chamber while at about the same time additional products may be transported or removed from other chambers.

In FIG. 4, a cutaway view is shown of chamber 8A into which film overwrapped product 3A has been transported. A piston 4A including sealing means 5A has been brought into communication with chamber 8A, thereby defining in part the said chamber's volumetric capacity and confining that chamber. The manner of film shrinkage is generally the same as described in reference to FIGS. 1, 2 and 3. However, when gas is compressed by the action of slidable piston 4A being moved by actuator 6A, the gas contained within the space defined by overwrapped film 2A is allowed to escape through a hole 12 in said film, said hole being communicatory to spaces interior and exterior thereof.

This hole may be necessary in some instances to prevent film rupture; but, if the film is not sealed prior to heat shrinkage, or if the seal is not completely air-tight, or if the film is being used as a shrink cover, or in other like instances a hole would not be required.

As film shrinkage is taking place in chamber 8A, film yet-to-be heat shrunk, or having been previously heat shrunk may be transported into or removed from chamber 8B or 8C. Subsequent to completing the film shrinking in chamber 8A the body 10 housing the chamber plurality is then moved in somewhat linear fashion by body actuating means 11 so that a chamber containing a yet-to-be heat shrunk film package is brought into communication with piston and piston actuating means 4C and 6C respectively.

Therefore, in serial manner are the cylinders 8A, 8B, and 8C moved in relation to the piston 4A so that a film enclosing a product may be transported into a cylinder while other film products are being likewise processed in other cylinders.

Figure 5:
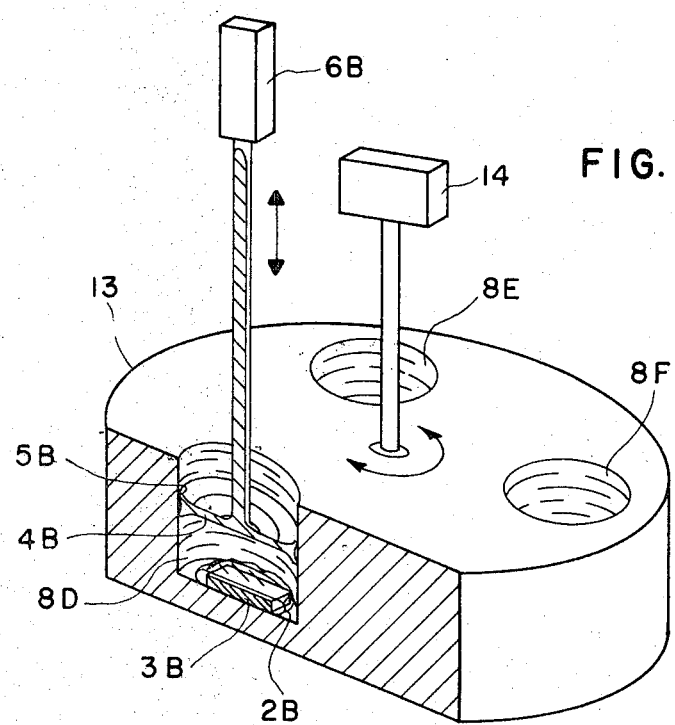
FIG. 5 is a simplified view of a body housing a plurality of chambers showing how relative arcuate motion is possible between said body and a piston compressing means.

In FIG. 5, a circular body 13 housing chambers 8D, 8E, and 8F is shown. The function of elements in FIG. 5 is generally the same as the function of elements of FIG. 4. FIG. 5 is also intended to reveal steps and means by which at least one film, 2B, enclosed about object 3B may be heat shrunk in one chamber while at about the same time additional products may be transported into or transported from other chambers. However, the transfer motion of body 13 in FIG. 5 to piston 4B and seals 5B and piston actuator means 6B is relative circular or arcuate. Whereas, the linear motion of body 10 in FIG. 4 must be reversed from time to time, the circular motion or rotation of body 13 about actuator 14 may be constant.

Having hereinabove described the present invention, I claim:

1. A process for heat shrinking an oriented polymeric member comprising:
    (a) providing a zone which may be confined,
    (b) introducing said member into said zone,
    (c) providing a compressible fluid within said zone,
    (d) confining said zone and increasing the pressure of said fluid within said zone thus increasing the fluid temperature sufficiently to heat shrink said member.

2. The process of claim 1 wherein said member is a filament.

3. A process for heat shrinking an oriented polymeric film enclosing an object comprising:
    (a) at least partially enclosing an object in said film to form a package,
    (b) providing a zone which may be confined,
    (c) transporting said package into said zone,
    (d) confining said zone,
    (e) compressing the fluid contained therein whereby the temperature and pressure of said fluid increases so that said polymeric film in the presence of the heated fluid heat shrinks about said object, and
    (f) removing said package from said zone.

4. A process according to claim 3 whereby the pressure of fluid contained within said zone is reduced prior to the removal of said product.

5. A process according to claim 3 including reducing the volumetric capacity of said zone whereby the aforesaid increase in fluid pressure and temperature occurs and the aforesaid heat shrinking of said film takes place.

6. A process according to claim 5 including subsequent to the reduction of volumetric capacity of said zone and heat shrinking of said film contained therein, the increasing of the volumetric capacity of said zone more than the least capacity heretofore defined and removing said package from said zone.

7. A process for serially heat shrinking the films at least partially enclosing a plurality of objects to form packages comprising:
    (a) providing a body housing at least first and second zones,
    (b) providing means to confine said zones and to increase the pressure of gases contained therein, (c) transporting a first package into a first zone,
(d) confining said first zone and increasing the pressure of gases contained therein, whereby the film of said first package is heat shrunk,
(e) transporting a second package into a second zone,
(f) removing said first package from said first zone,
(g) confining said second zone and increasing the pressure of gases contained therein whereby the film of said second package is heat shrunk, and
(h) removing said second package from said second zone.

8. A process for heat shrinking irradiated biaxially oriented polyethylene film at least partially enclosing an object to form a package comprising:
(a) detaching one end of a cylindrical chamber,
(b) transporting said package into the chamber through the opening created,
(c) rejoining said opened end portion,
(d) reducing the volumetric capacity of said chamber by a piston means slidable within the chamber so that the pressure of air within the chamber is raised to between 350 and 450 p.s.i. and the resulting temperature is between 550° F. and 800° F.,
(e) increasing the volumetric capacity of said chamber more than the least capacity heretofore defined,
(f) detaching the aforesaid cylinder end portion, and
(g) removing said package from said chamber.

References Cited
UNITED STATES PATENTS
3,443,356  5/1969  Hani _____ 53—184

TRAVIS S. McGEHEE, Primary Examiner

E. F. DESMOND, Assistant Examiner

U.S. Cl. X.R.

34—15, 242; 53—184